INVENTOR
Mearle C. Armstrong

United States Patent Office 3,465,391
Patented Sept. 9, 1969

3,465,391
SURE-HOLD-NONSLIP ROPE FASTENER
Mearle C. Armstrong, R.R. 6, Rensselaer, Ind. 47978
Filed Nov. 29, 1967, Ser. No. 686,649
Int. Cl. B63b 21/04
U.S. Cl. 24—115                                    1 Claim

ABSTRACT OF THE DISCLOSURE

A rope securing device, including a mounting plate and a generally Y-shaped post secured upon the plate, around which a rope may be secured. The post is formed of bar-stock having one arm substantially parallel to the plate for receiving a rope thereon. A guide post is provided on the plate as a guide.

---

This invention relates generally to combination chocks and cleats.

A principal object of the present invention is to provide an improved rope holding device which will positively retain the rope to prevent the same from slipping loose.

Another object of the present invention is to provide a rope fastener which includes a generally Y-configurated stanchion upon a mounting base and which further includes a guide post for the rope.

Yet a further object of the present invention is to provide a rope fastener which is designed particularly for quickly securing a rope thereto and also for quickly unsecuring the same therefrom.

Still a further object of the present invention to provide a rope fastener wherein the harder that the stress is provided upon a rope, the tighter it will hold upon the rope fastener.

Yet another object of the present invention is to provide a rope fastener which is adaptable for use upon boats, boat docks, trucks, flagpoles, and the like.

Other objects of the present invention are to provide a rope fastener which is simple in design, inexpensive to manufacture, rugged in construction, easy to use and efficient in operation.

Figure 1:
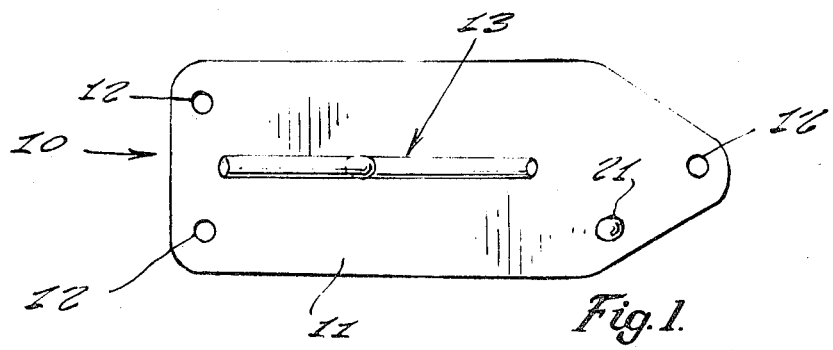
Figure 2:
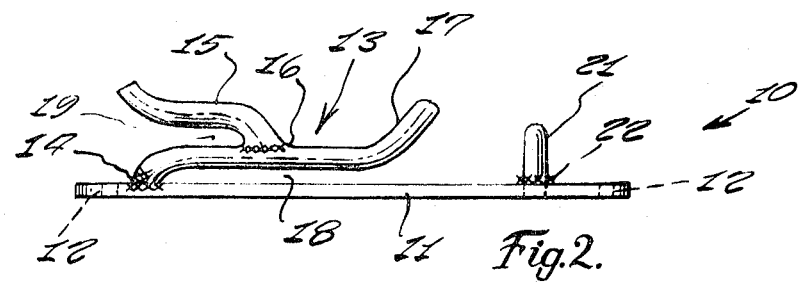
Figure 3:
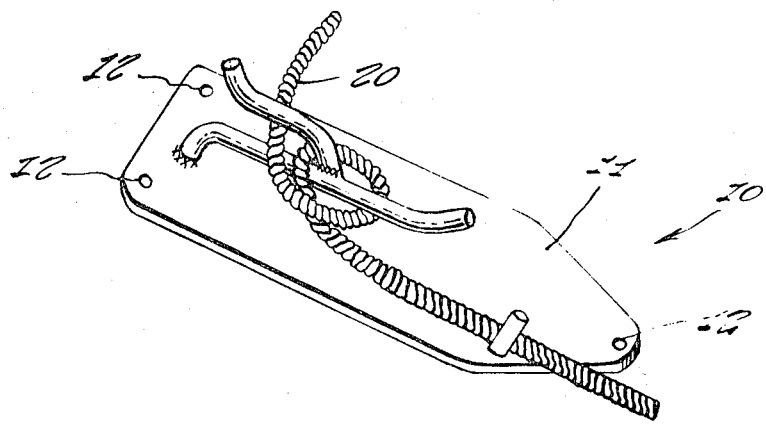

These and other objects will become readily evident upon a study of the following specification and the accompanying drawing wherein:

FIGURE 1 is a top plan view of the present invention;
FIGURE 2 is a side elevation view thereof; and
FIGURE 3 is a perspective view thereof shown in operative use.

Referring now to the drawing in detail, the reference numeral 10 represents a sure-hold, non-slip rope fastener, according to the present invention wherein there is a metal base plate 11 of generally flat character and being provided with a plurality of openings 12 therethrough for the purpose of receiving mounting screws so as to secure the fastener to a supporting device.

A stanchion 13 formed of round, oval or octagon bar-stock is secured upon the upper side of the base plate by means of a brazed or welded joint 14, or by being peened. The stanchion 13 of which is generally Y-configuration and including a short arm 15 brazed at 16 to a longer arm 17 thus forming the stanchion. As is shown in FIGURE 2 of the drawings, the throat 18 is formed between the arm 17 and the base plate 11, and a throat 19 is formed between the arm 15 and arm 17 for purpose of receiving a rope 20 therethrough.

An upstanding post 21 is likewise secured by a brazed joint 22 upon the upper side of the base plate and serves as a rope guide when the rope fastener is used to tie objects such as a boat which is subject to turning or swinging.

It is to be noted that stanchion 13 is generally horizontal in character and is therefore relatively low rather than being tall in nature.

In operative use, as shown in FIGURE 3, a rope 20 may be quickly tied upon the rope fastener by simply passing the end of the rope into the throat 19 and then into the throat 18 after which it is again reinserted into the throat 19, as is shown, thus providing a sure-hold, non-slip securement. It will be readily evident that the rope may be easily and quickly untied from the rope fastener by simply reversing the uncoiling movement of the rope end out of the throats.

While various changes may be made in the detailed construction, it is understood that such changes will be within the spirit and scope of the present invention as is defined by the appended claims. It is to be noted that the main portion of the arms are parallel to each other and also parallel to the base plate, as shown in the drawing. It is to be further noted that the two arms extend in opposite directions toward their terminal ends.

I claim:
1. In a rope fastener, the combination of a metal base plate, and a metal stanchion rigidly secured upon said base plate, said stanchion providing a securement to which a rope may be coiled, said metal base plate comprising a flat member having a plurality of openings therethrough for purpose of receiving mounting bolts for securement of said base plate upon a supporting surface, said stanchion comprising a generally Y configurated element made from a pair of round metal bars, one of said bars comprising a long arm generally parallel to said base and spaced therefrom and being downwardly turned at one end and secured upon said base, the other bar comprising a short arm generally parallel to said long arm and spaced thereabove, said short arm being downwardly turned at one end and secured to an intermediate midportion of said long arm, said short arm extending in a direction opposite to said long arm, the opposite ends of said arms being upwardly turned, a first throat being formed between said long and short arm, and a second throat being formed between said long arm and said base, said second throat being approximately twice as long the first throat and having a one-half portion thereof extending below the entire said first throat.

References Cited
UNITED STATES PATENTS

| | | | |
|---|---|---|---|
| 517,597 | 4/1894 | Twitty | 24—130 |
| 1,106,227 | 8/1914 | Laurent | 24—131 |
| 2,743,496 | 5/1956 | Looker | 24—131 X |

FOREIGN PATENTS

| | | |
|---|---|---|
| 16,398 | 12/1884 | Great Britain. |

BERNARD A. GELAK, Primary Examiner

U.S. Cl. X.R.
24—129, 130; 114—218